(12) United States Patent
Johnson

(10) Patent No.: US 12,097,976 B2
(45) Date of Patent: Sep. 24, 2024

(54) HORIZONTAL INTEGRATION TOOLING FOR LAUNCH VEHICLES, AND ASSOCIATED SYSTEMS AND METHODS

(71) Applicant: Blue Origin, LLC, Kent, WA (US)

(72) Inventor: Derek Johnson, Seattle, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 18/364,069

(22) Filed: Aug. 2, 2023

(65) Prior Publication Data

US 2024/0017851 A1 Jan. 18, 2024

Related U.S. Application Data

(62) Division of application No. 17/321,058, filed on May 14, 2021, now Pat. No. 11,753,183.

(51) Int. Cl.
*B23P 19/10* (2006.01)
*B23Q 3/18* (2006.01)
*B64F 5/10* (2017.01)

(52) U.S. Cl.
CPC ............... *B64F 5/10* (2017.01); *B23P 19/10* (2013.01); *B23Q 3/186* (2013.01)

(58) Field of Classification Search
CPC .......... B25B 11/00; B23Q 3/00; B23Q 3/063; B23Q 3/06; B23P 19/10; B64F 5/10; B64F 5/40; B64F 5/60; Y10T 29/53913; Y10T 29/53917

USPC ..... 29/281.1, 281.3, 281.6; 269/17, 291, 43, 269/66

See application file for complete search history.

(56) References Cited

U.S. PATENT DOCUMENTS

| | | |
|---|---|---|
| 3,952,936 A | 4/1976 | Dearman et al. |
| 4,356,615 A | 11/1982 | Dearman et al. |
| 4,708,330 A | 11/1987 | Ehl |
| 5,094,435 A | 3/1992 | Depperman et al. |
| 5,477,597 A | 12/1995 | Catania et al. |
| 5,806,797 A | 9/1998 | Micale |

(Continued)

OTHER PUBLICATIONS

YouTube video: "How Airplanes Are Made," https://youtu.be/7rMgpExA4KM?t=176, Dec. 19, 2014, 2 pages.

(Continued)

*Primary Examiner* — Abbie E Quann
(74) *Attorney, Agent, or Firm* — Hogan Lovells US LLP

(57) ABSTRACT

A representative system includes an alignment tool for aligning attachment interfaces of horizontally-oriented launch vehicle portions. The tool can include a receiver assembly for connecting to a first launch vehicle portion and an actuation assembly for connecting to a second launch vehicle portion. When a first connecting element of the receiver assembly is engaged with a second connecting element of the actuation assembly, the second connecting element can apply force to the receiver assembly, and the actuator assembly applies an opposite force to the second launch vehicle portion, to align fastening features in the launch vehicle portions and/or to reshape the launch vehicle (Continued)

portions. A representative method includes connecting the alignment tool to the launch vehicle portions and operating the tool to apply oppositely-directed forces to align the launch vehicle portions for installing fasteners to connect the launch vehicle portions. One or more bracing beams can connect two tools together.

20 Claims, 8 Drawing Sheets

(56) References Cited

U.S. PATENT DOCUMENTS

| | | | |
|---|---|---|---|
| 5,941,513 | A | 8/1999 | Moilanen et al. |
| 8,474,806 | B2 | 7/2013 | Orgeron |
| 8,620,470 | B2 | 12/2013 | Cobb |
| 9,752,296 | B2 * | 9/2017 | DePietro ............. E02D 29/1445 |
| 2002/0073535 | A1 | 6/2002 | Radowick |
| 2011/0291342 | A1 | 12/2011 | Gindy et al. |
| 2022/0363411 | A1 | 11/2022 | Johnson |

OTHER PUBLICATIONS

YouTube video: "Giant Aircraft: Manufacturing an Airbus A350, Mega Manufacturing, Free Documentary," https://www.youtube.com/watch?v=Yutzg2NLwcU, Dec. 8, 2019, 2 pages.

DWT Pipe Tools, "Pipe Welding Clamps," https://www.dwt-pipetools.com/en/pipe-welding-tools/pipe-welding-alignment/pipe-welding-clamps/, 2021, 1 page.

YouTube Video: "Internal Flange Alignment Tool, Clamp by Three Different Manufacturers," https://www.youtube.com/watch?v=4d988BtNvwl, Jul. 23, 2019, 2 pages.

Piping Engineering, "Internal Flange Alignment Tool," https://www.pipingengineer.org/internal-flange-alignment-tool/, accessed May 3, 2021, 3 pages.

Monroe—How Can We Help?, "De-Sta-Co Straight Line Action Clamps, " https://catalog.monroeengineering.com/category/de-sta-co-straight-line-action-clamps, 2021, 3 pages.

McMaster-Carr website: https://www.mcmaster.com/over-center-clamps/, accessed 2021, 4 pages.

EnerPac website: ATM9, 10 Ton, Flange Alignment Tool, https://www.enerpac.com/en-US/hydraulic-flange-alignment-tool/ATM9, accessed 2021, 9 pages.

YouTube video: Piping Flange Alignment Tools, Equalizer, https://www.youtube.com/watch?v=vbz25Y6Lf88, Sep. 27, 2018, 2 pages.

Mathew Dearman website: Pipe Alignment and Reforming Clamps and Stands, https://www.mathey.com/clamping-all-products.htm, accessed 2021, 11 pages.

Mathey Dearman, Super Clamps, https://www.mathey.com/Pages/clamp-super-clamp.htm, accessed 2021, 5 pages.

Sawyer MFG, Rim Clamp, https://sawyermfg.com/equipment/rim-clamp/, accessed 2021, 5 pages.

YouTube video: Delta 4-Heavy Processing—Second Stage Mate, https://youtu.be/hDsfUlqIWCk, Nov. 11, 2014, 2 pages.

Wikipedia—Horizontal Integration Facility, https://en.wikipedia.org/wiki/Horizontal_integration_facility, updated Jan. 16, 2021, 5 pages.

NASA—Cygnus/Antares mate, https://www.nasa.gov/content/cygnusantares-mate, updated Aug. 7, 2017, 2 pages.

Science Focus: How does SpaceX build its Falcon 9 reusable rocket? https://www.sciencefocus.com/space/how-does-spacex-build-its-falcon-9-reusable-rocket/, accessed 2021, 9 pages.

YouTube video:Ariane 6 at Europe's Spaceport, https://youtu.be/XPpx6e5XCNo?t=53, Jul. 23, 2019, 2 pages.

Ariane 6—ESA Space Transportation Program (Ariane 6, Vega, Prometheus), https://web.archive.org/web/20210121013254/https:/directory.eoportal.org/web/eoportal/satellite-missions/a/ariane-6, 2000, 71 pages.

YouTube video: "Steel Pipe Alignment Clamps," https://www.youtube.com/watch?v=hsuwVLOtj4g, May 31, 2017, 1 page.

\* cited by examiner

HORIZONTAL INTEGRATION TOOLING FOR LAUNCH VEHICLES, AND ASSOCIATED SYSTEMS AND METHODS

CROSS-REFERENCE TO RELATED APPLICATION(S)

The present application is a divisional of U.S. patent application Ser. No. 17/321,058, filed May 14, 2021, now U.S. Pat. No. 11,753,183, issued on Sep. 12, 2023, which is incorporated herein by reference in its entirety.

TECHNICAL FIELD

The present disclosure is directed generally to horizontal integration tooling for launch vehicles, and associated systems and methods. Representative aspects of the present disclosure include an alignment tool for aligning attachment interfaces of horizontally-oriented rocket sections. More generally, aspects of the technology relate to alignment systems and methods for integrating cylindrical or tubular structures.

BACKGROUND

Launch vehicles and other rocket systems are traditionally assembled at or near a launch site from multiple component sections. For example, two, three, or even more cylindrical sections can be attached together to form a cylindrical launch vehicle body. Some launch vehicle systems are assembled vertically by stacking the component sections on top of other component sections. For large launch vehicles made with several component sections, vertical assembly can be challenging as the height of the launch vehicle body can require tall assembly buildings and equipment. Accordingly, horizontal integration may be preferable for some launch vehicles. Component sections may be oriented horizontally and assembled at ground level.

One challenge associated with horizontal integration is the tendency for component sections to sag and deflect out of their intended shapes due to gravity. For example, a circular section may deflect toward an oval shape. Sag and deflection can hinder connection of component sections by causing misalignment of fastening features. Aspects of the present disclosure are directed to addressing this challenge.

BRIEF DESCRIPTION OF THE DRAWINGS

In the drawings, wherein the same reference number indicates the same element throughout the views.

DETAILED DESCRIPTION

Figure 1:
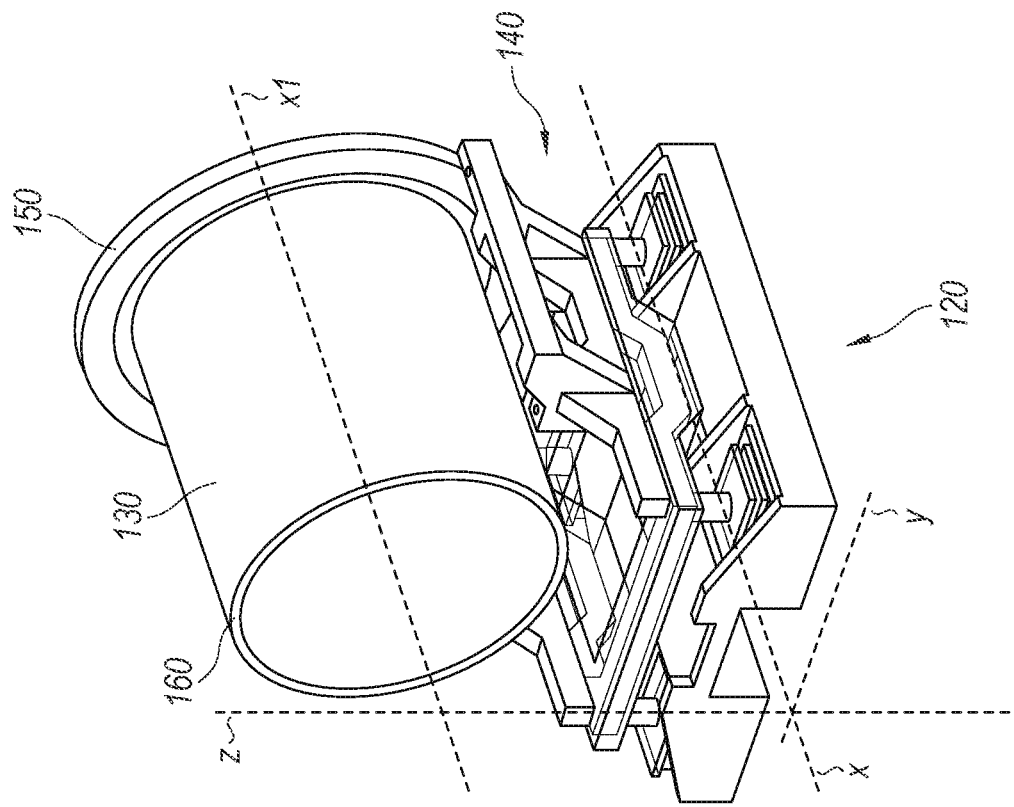
FIG. 1 is a partially schematic perspective view of two horizontally-oriented launch vehicle portions being brought together for integration.
Figure 1:
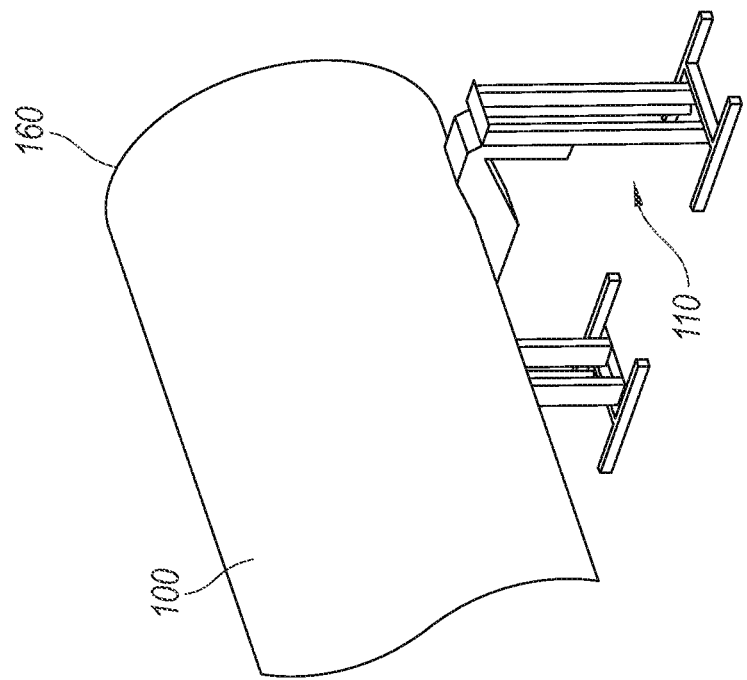

Embodiments of the technology disclosed herein are directed generally to alignment systems and methods for integrating cylindrical or tubular structures. Several embodiments of the present technology are directed to alignment tools for aligning fastener holes in launch vehicle portions, but the present technology can generally be used to connect tubular structures other than launch vehicle portions.

A representative method of aligning and fastening a first launch vehicle portion to a second launch vehicle portion includes connecting a receiver assembly to the first launch vehicle portion, connecting an actuation assembly to the second launch vehicle portion, establishing contact between the receiver assembly and the actuation assembly, and operating the actuation assembly to apply oppositely-directed forces to the receiver assembly and to the second launch vehicle portion, until a first fastener hole in the first launch vehicle portion aligns with a second fastener hole in the second launch vehicle portion.

Connecting the receiver assembly to the first launch vehicle portion can include positioning a first peg in a first fastener hole in the first launch vehicle portion. Connecting the actuation assembly to the second launch vehicle portion can include positioning a second peg in a second fastener hole in the second launch vehicle portion. Establishing contact between the receiver assembly and the actuation assembly can include engaging a first connecting element carried by the receiver assembly with a second connecting element carried by the actuation assembly. Other representative methods include connecting a second receiver assembly to the first launch vehicle portion, connecting a second actuation assembly to the second launch vehicle portion, and establishing contact between the second receiver assembly and the second actuation assembly. Further representative methods include connecting the first receiver assembly to the second receiver assembly and/or connecting the first actuation assembly to the second actuation assembly, via one or more bracing beams.

A representative system for aligning first fastener holes in a first tubular structure (such as a first launch vehicle portion) with second fastener holes in a second tubular structure (such as a second launch vehicle portion) includes an alignment tool having a receiver assembly and an actuation assembly. The receiver assembly can include a first chassis, a first peg attached to the first chassis and configured to be positioned in one of the first fastener holes, and a first connecting element attached to the first chassis. The actuation assembly can include a second chassis, a second peg attached to the second chassis and configured to be positioned in one of the second fastener holes, and a second connecting element movably attached to the second chassis. The first connecting element and the second connecting element are positioned and configured to engage one another, such that when the first connecting element is engaged with the second connecting element and the second connecting element is moved relative to the second chassis, the actuation assembly applies a first force to the receiver assembly and a second force to the second tubular structure that is opposite the first force, to align one or more fastening features in the tubular structures and/or to de-ovalize, round, or reshape the tubular structures.

Several details describing structures and processes that are well-known and often associated with launch vehicles are not set forth in the following description to avoid obscuring other aspects of the disclosure. Moreover, although the following disclosure sets forth several embodiments, several other embodiments can have configurations, arrangements, and/or components that are different than those described in this section. In particular, other embodiments may have additional elements, and/or may lack one or more of the elements described below with reference to FIGS. 1-10.

FIG. 1 is a partially schematic perspective view of two horizontally-oriented launch vehicle portions (which may also be referred to as rocket sections) being brought together for integration. A first portion 100 may be fixed in a support 110. A movable platform 120 can carry a second portion 130 and can manipulate the second portion 130 into position adjacent to the first portion 100 to mate or integrate the two portions 100, 130. Accordingly, the movable platform 120 can move the first and/or second portions 100, 130 relative to each other until they are properly aligned for connection.

In some embodiments, the movable platform 120 provides multiple degrees of freedom of movement of the second portion 130 (e.g., six degrees of freedom). For example, the movable platform 120 can move along the horizontal x- and/or y-axes using wheels or tracks. The movable platform 120 can include a jack structure 140 that provides vertical movement along the z-axis. The jack structure 140 can optionally move the second portion 130 along the x-axis and/or y-axis relative to the remainder of the movable platform 120. The jack structure 140 can also rotate the second portion 130 about a horizontal axis x1 (which can be the central axis of the second portion 130) by rotating a removable frame or rotation ring 150 attached to the second portion 130. In some embodiments, the jack structure 140 can tilt the second portion 130 (for example, about an axis parallel to the y-axis). The movable platform 120 (including the jack structure 140) can position the second portion 130 to abut the first portion 100, so that the first portion 100 and the second portion 130 can be integrated together at a mating interface 160. The portions 100, 130 can be bolted, welded, or otherwise attached together. In particular representative embodiments, the portions 100, 130 are bolted together after being aligned and rounded or de-ovalized, as described in additional detail below.

Figure 2:
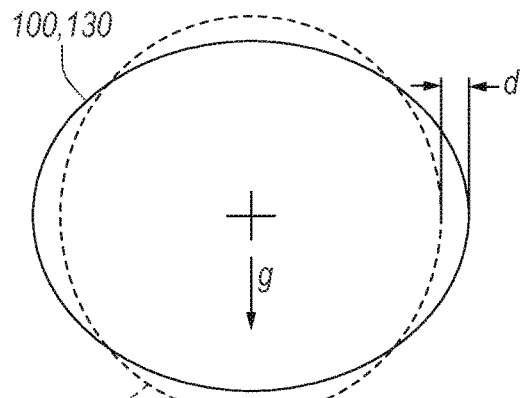
FIG. 2 is a schematic diagram of the sag and/or deflection of a launch vehicle portion (such as one of the portions illustrated in FIG. 1) as a result of being horizontally-oriented.

FIG. 2 is a schematic diagram of the sag and/or deflection of a launch vehicle portion (such as one of the portions 100, 130 illustrated in FIG. 1) as a result of being horizontally-oriented. Gravity (indicated by arrow g) tends to pull downwardly on a top section of the launch vehicle portion 100, 130 while the bottom section is supported, causing the portions to deviate from the nominal shape 200. For example, a circular portion may deflect (e.g., by an amount d) towards an oval shape, or an oval shape may deflect to an even more oblong shape. A consequence of the deflection d is that bolt holes or other fastening features in the mating portions 100, 130 may not align, which frustrates the horizontal integration process.

Figure 3A:
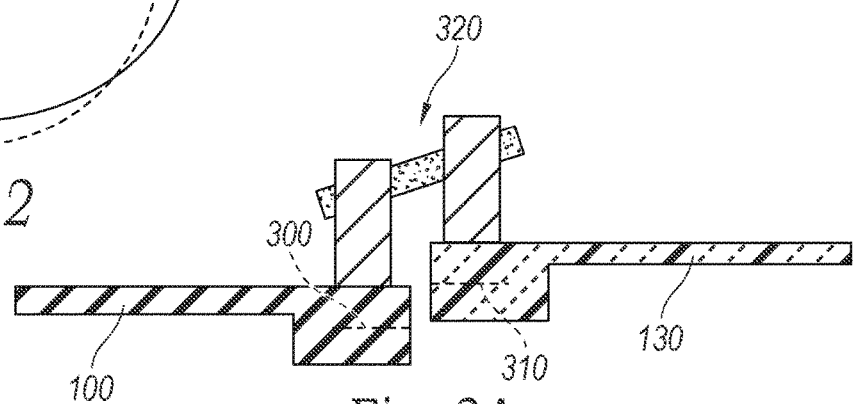
FIGS. 3A and 3B illustrate schematic diagrams of an alignment strategy for rounding or de-ovalizing the launch vehicle portions to align bolt holes or other fastening features.
Figure 3B:
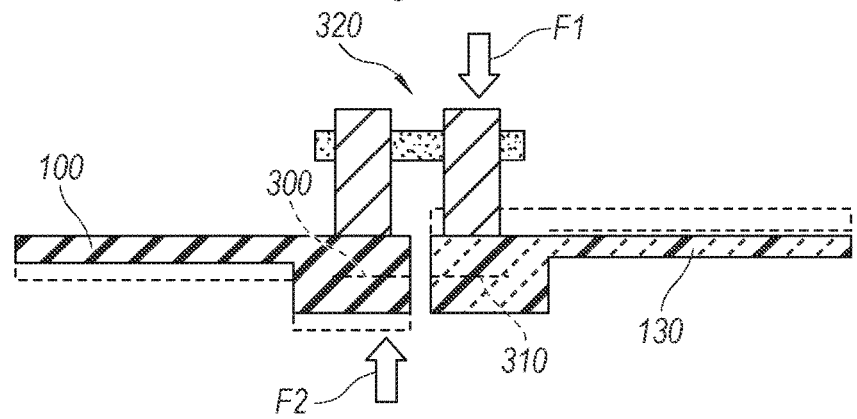

FIGS. 3A and 3B illustrate schematic diagrams of an alignment strategy for rounding or de-ovalizing the launch vehicle portions 100, 130 to align bolt holes or other fastening features. FIG. 3A shows the portions 100, 130 misaligned (e.g., due to sagging/deflecting under gravity). FIG. 3B shows the portions 100, 130 in alignment after corresponding opposing forces F1 and F2 (e.g., radially inward and outward forces) have been applied to the portions 100, 130. The opposing forces F1, F2 cause the launch vehicle portions 100, 130 to align, thereby also causing the bolt holes and/or other fastening features to align. Fastener centerlines 300, 310 are shown schematically in FIGS. 3A and 3B to illustrate the need for, and subsequent provision of, aligning the bolt holes so that the portions 100, 130 can be readily brought together for integration. An alignment tool 320 is schematically illustrated in FIGS. 3A and 3B to illustrate a device for providing the forces F1 and F2 to adjust the alignment of the portions 100, 130. Alignment tools configured in accordance with embodiments of the present technology are described in additional detail below.

Figure 4:
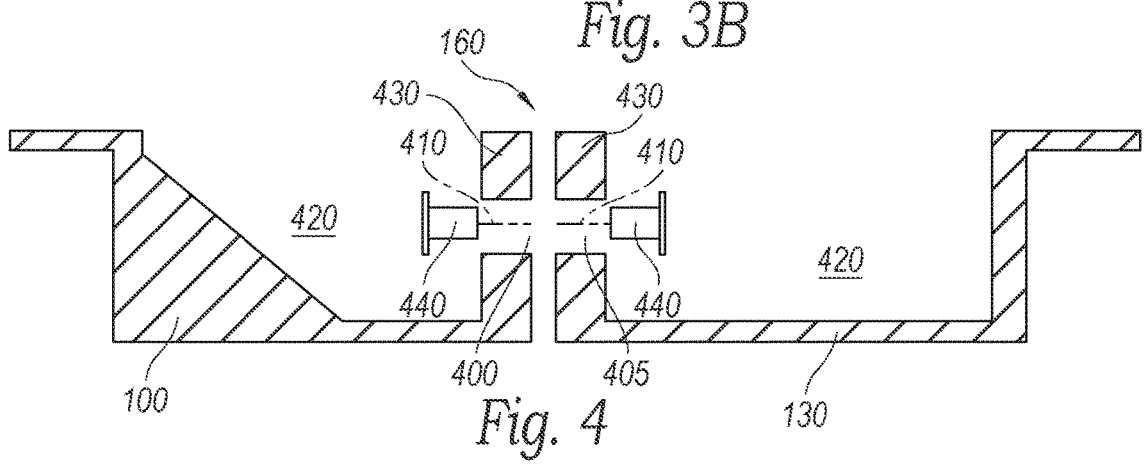
FIG. 4 illustrates a partially schematic side cross-sectional view of a portion of the mating interface between the launch vehicle portions, in accordance with some embodiments of the present technology.

FIG. 4 illustrates a partially schematic side cross-sectional view of a portion of the mating interface 160 between the launch vehicle portions 100, 130, in accordance with some embodiments of the present technology. The first launch vehicle portion 100 can include a suitable quantity of first fastener holes or first bolt holes 400, and/or other fastening features, distributed around the perimeter (e.g., the circumference) of the launch vehicle portion 100. The second launch vehicle portion 130 can include a suitable quantity of corresponding second fastener holes or second bolt holes 405, and/or other fastening features, distributed around the perimeter (e.g., the circumference) of the launch vehicle portion 130. The bolt holes 400, 405 can be configured to accommodate a bolt/fastener that passes through the bolt holes 400, 405 when the bolt holes 400, 405 are aligned, to integrate the launch vehicle portions 100, 130. In some embodiments, the bolt holes 400, 405 may have axes 410 that are parallel to, or nearly parallel to, a longitudinal axis of a launch vehicle portion 100, 130 (e.g., axis x1 in FIG. 1). In such a configuration, to provide access to the bolt holes 400, 405 and any bolts therein, one or both of the launch vehicle portions 100, 130 can include a radially-inward depression or bathtub region 420 that provides an open space for tooling to reach the bolt holes 400, 405. The bolt holes 400, 405 can be positioned in flanges 430 extending radially outwardly from the bathtub region 420.

In some embodiments, forces (e.g., forces F1 and F2 in FIGS. 3A and 3B) can be applied to the bolt holes 400, 405 to move or shape the launch vehicle portions 100, 130 to be round or to have another desired shape, and/or to align the bolt holes 400, 405. As described in further detail below, an alignment tool configured in accordance with embodiments of the present technology applies the forces to the bolt holes 400, 405 via pegs or other features that engage the bolt holes 400, 405. To protect the bolt holes 400, 405, in some embodiments, bushings 440 may be permanently or temporarily positioned in the bolt holes 400, 405. The bushings 440 may receive the forces to move or align the launch vehicle portions 100, 130. In some embodiments, the bushings 440 may be formed with a softer metal than the material forming the bolt holes 400, 405, so that the bushings absorb unintended damage from realignment forces and/or the tooling, and protect the bolt holes 400, 405.

Figure 5:
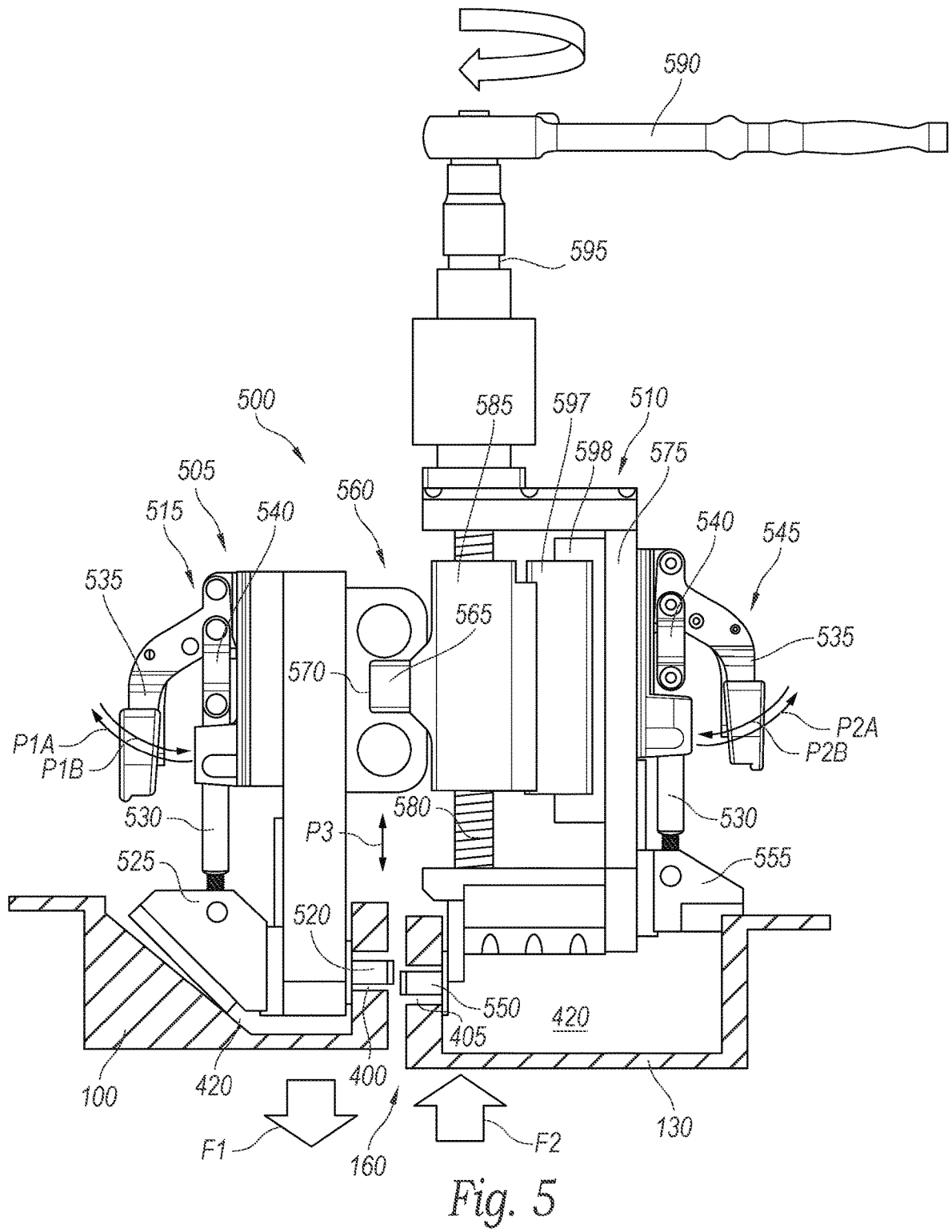
FIG. 5 is a side schematic view of an alignment tool configured in accordance with embodiments of the present technology, positioned to align the launch vehicle portions for integration together. The alignment tool includes an actuation assembly and a receiver assembly.

FIG. 5 is a side schematic view of an alignment tool 500 configured in accordance with embodiments of the present technology, positioned to align the launch vehicle portions 100, 130 for connection (e.g., via bolts or other fasteners). The alignment tool 500 can include a receiver assembly 505 and an actuation assembly 510. Each of the assemblies 505, 510 can include a peg for engaging one of the bolt holes 400, 405 to apply force to the bolt holes. For example, the receiver assembly 505 can include a receiver peg 520 for positioning in one of the first bolt holes 400 of the first launch vehicle portion 100 and the actuation assembly 510 can include an actuation peg 550 for positioning in one of the second bolt holes 405 of the second launch vehicle portion 130.

In operation, the tool 500 applies a first force to the first launch vehicle portion 100 via the receiver peg 520 engaging with the first bolt hole 400 (e.g., the radially inward force F1), and the tool 500 also applies an opposing second force to the second launch vehicle portion 130 via the actuation peg 550 engaging with the second bolt hole 405 (e.g., the radially outward force F2). The pegs 520, 550 radially push or pull on the bolt holes 400, 405 to move and/or reshape the launch vehicle portions 100, 130.

The tool 500 occupies and adjusts (e.g., aligns) one pair of bolt holes 400, 405 in the launch vehicle portions 100, 130. Adjustment of the bolt holes 400, 405 occupied by the tool 500 can consequently align other corresponding pairs of bolt holes which are not occupied by the pegs 520, 550. For example, FIG. 8, which is described in further detail below, illustrates tools 500 aligning bolt holes that are not occupied by the pegs 520, 550. When the bolt holes that are not occupied by the pegs 520, 550 are aligned, fasteners can be installed in those unoccupied bolt holes. When the fasteners are installed, they hold their corresponding bolt holes in alignment so that the tool 500 can be removed to install fasteners where the tool previously was located, and/or the tool 500 can be relocated to another part of the launch vehicle portions 100, 130 in need of alignment.

In FIG. 5, the pegs 520, 550 are illustrated as having clearances within the bolt holes 400, 405. In some embodiments, such clearances may be minimized and the pegs 520, 550 may fit in the bolt holes 400, 405 with any tolerance suitable for engaging the bolt holes 400, 405. In some embodiments, the optional bushing 440 (see FIG. 4) may be positioned in a bolt hole 400, 405 and the peg 520, 550 may be positioned in the bushing 440. The pegs 520, 550 can be cylindrical pegs in some embodiments, or they may have another elongated shape suitable for engaging the bolt holes 400, 405 and/or the bushings 440.

The illustrated receiver assembly 505 further includes a locking mechanism 515. The locking mechanism 515 and the receiver peg 520 connect the receiver assembly 505 to the first launch vehicle portion 100. When the receiver peg 520 is in the bolt hole 400 of the first portion 100, the locking mechanism 515 can be activated to fix the receiver assembly 505 to the first portion 100. For example, the locking mechanism 515 can include a movable shoe 525 positioned to press against the first portion 100. To move the movable shoe 525 to press against the first portion 100, the locking mechanism 515 can include a pushing rod 530 connected to the movable shoe 525. In some embodiments, the locking mechanism 515 can include a suitable pushing device for moving the pushing rod 530, such as a lever 535 connected to the pushing rod 530 with a suitable linkage 540. Collectively, in some embodiments, a lockable toggle clamp can include the pushing rod 530, the lever 535, and the linkage 540. Accordingly, in some embodiments, a commercial off-the-shelf toggle clamp (such as a lockable over-center clamp) may be implemented to apply force to the movable shoe 525.

FIG. 5 shows the locking mechanism 515 in a deactivated condition. The lever 535 can move along a pathway generally labeled P1A to apply leverage to the linkage 540 and to therefore move the pushing rod 530 and the movable shoe 525 toward the first portion 100 to press the movable shoe 525 against the first portion 100. When the movable shoe 525 is pressed against the first portion 100, the force of the shoe 525 against the first portion 100 and the force of the receiver peg 520 against the bolt hole 400 tends to fix the receiver assembly 505 on the first portion 100. In such a configuration, the locking mechanism 515 (which may include a commercial off-the-shelf toggle clamp) provides for safe operation of the tooling/system by locking components in place prior to operation. To release the locking mechanism, the lever 535 can move along a pathway generally labeled P1B to move the pushing rod 530 and the movable shoe 525 away from the first portion 100, which loosens the receiver assembly 505 from the first launch vehicle portion 100, allowing the receiver assembly 505 to be removed.

The actuation assembly 510 can connect to the second launch vehicle portion 130 in a manner similar to the connection of the receiver assembly 505 to the first launch vehicle portion 100. For example, the actuation assembly 510 includes a locking mechanism 545. The locking mechanism 545 of the actuation assembly 510 and the actuation peg 550 of the actuation assembly 510 connect the actuation assembly 510 to the second launch vehicle portion 130. When the actuation peg 550 is in the bolt hole 405 of the second launch vehicle portion 130, the locking mechanism 545 can be activated to fix the actuation assembly 510 to the second portion 130. The locking mechanism 545 can include a movable shoe 555 positioned to press against the second portion 130. A pushing rod 530 driven by a suitable pushing device, such as a lever 535 connected to the pushing rod 530 with a suitable linkage 540, can move the movable shoe 555 in a manner similar to the function of the pushing rod 530, lever 535, and linkage 540 described above with regard to the receiver assembly 505 (e.g., the lever 535 can move along a pathway generally labeled P2A to move the shoe 555 toward the second portion 130, and along an opposing pathway P2B to move the shoe away from the second portion 130). When the movable shoe 555 is pressed against the second portion 130, the force of the shoe 555 against the second portion 130 and the force of the actuation peg 550 against the bolt hole 405 of the second portion 130 tends to fix the actuation assembly 510 on the second portion 130. In such a configuration, the locking mechanism 545 (which may include a commercial off-the-shelf toggle clamp) provides for safe operation of the tooling/system by locking components in place prior to operation. Moving the lever 535 to release the pressure of the movable shoe 555 against the second portion 130 can release the actuation assembly 510 from the second portion 130.

When the receiver assembly 505 and the actuation assembly 510 are fixed to the first and second launch vehicle portions 100, 130, respectively, the receiver assembly 505 and the actuation assembly 510 can also be engaged with each other at a force interface 560. The force interface 560 is a contact area between the receiver assembly 505 and the actuation assembly 510 that facilitates transferring force between the receiver assembly 505 and the actuation assembly 510. As the actuation assembly 510 drives against the receiver assembly 505, they contact each other to transfer force. The actuation assembly 510 applies opposing forces to the receiver assembly 505 and to the second launch vehicle portion 130 (via the peg 550 in the bolt hole 405) to move and/or reshape the portions 100, 130 relative to each other. In other words, as a consequence of the forces transferred at the force interface 560, each of the receiver assembly 505 and the actuation assembly 510 apply forces to their respective pegs 520, 550, which in turn apply forces to the bolt holes 400, 405 (for example, via shear force(s) transferred from the pegs 520, 550 to the bolt holes 400, 405). The actuation assembly 510 pushes the receiver assembly 505 along a radial pathway P3 to align the bolt holes 400, 405, de-ovalize the launch vehicle portions 100, 130, or to otherwise adjust the launch vehicle portions 100, 130 at the mating interface 160 to compensate for deflection from being horizontally oriented. Forces exchanged between the receiver assembly 505 and the actuation assembly 510 include the upward and/or downward forces F1 and F2 applied to the portions 100, 130 to cause them to align. Although the forces F1 and F2 are illustrated in FIG. 5 to show a downward (radially inward) force on the first portion 100 and an upward (radially outward) force on the second portion 130, the tool 500 can operate to provide forces in the opposite directions (reversing F1 and F2), depending on what adjustments of the launch vehicle portions 100, 130 are necessary to bring them into alignment.

In some embodiments, each of the actuation assembly 510 and the receiver assembly 505 include a connecting element, such that the connecting elements are configured to engage one another to transfer force between the receiver assembly 505 and the actuation assembly 510 at the force interface 560. For example, in some embodiments, the actuation assembly 510 includes an actuation nub 565 that is movable relative to the remainder of the actuation assembly 510 to impart a force on the receiver assembly 505. The receiver assembly 505 can include a socket 570 configured and positioned to receive the actuation nub 565 to receive force from the receiver assembly 505. Accordingly, in some embodiments, the actuation nub 565 and the socket 570 form the force interface 560. In some embodiments, the receiver assembly 505 can include the actuation nub 565 and the actuation assembly 510 can include the socket 570. In further embodiments, any suitable connecting elements can be carried by the receiver assembly 505 and the actuation assembly 510 to form the force interface 560, such as various arrangements of pins and bushings, a chain connection, a locking pin, or other suitable components or mechanisms for forming a contact area where contact can be established between the receiver assembly 505 and the actuation assembly 510 to transfer force.

The actuation assembly 510 can include a suitable mechanism for moving the actuation nub 565 relative to the remainder of the actuation assembly 510 to create force at the force interface 560. In a particular representative embodiment, the actuation assembly 510 includes a chassis 575 and a mechanism carried by the chassis that moves the actuation nub 565 relative to the chassis 575. In some embodiments, the mechanism can include a threaded shaft 580 that is rotatable relative to the chassis 575. An actuation block 585, which can carry and/or include the actuation nub 565, includes threaded internal components to facilitate traversal of the actuation block 585 along the threaded shaft 580 when the threaded shaft 580 is rotated (in a manner similar to the function of a lead screw or screw jack mechanism, such that the threaded shaft 580 functions as a lead screw and the actuation block 585 functions as a linear bearing). A suitable source of torque rotates the threaded shaft 580 to apply force to the actuation block 585 and the actuation nub 565, and consequently, to the receiver assembly 505. In some embodiments, a hand tool 590 can provide the torque on the threaded shaft 580. For example, the hand tool 590 can be a wrench for applying torque to an input shaft 595 connected to the threaded shaft 580.

Rotating the threaded shaft 580 forces the actuation nub 565 to radially push or pull the actuation assembly 510 and the receiver assembly 505 (along the pathway labeled P3) to bring the launch vehicle portions 100, 130 into their desired relative positions (e.g., to align their bolt holes 400, 405). The threaded shaft 580 can rotate in two opposing directions (e.g., clockwise and counter-clockwise) to move the actuation nub 565 in two opposing directions relative to the chassis 575. This allows the tool 500 to selectively force the launch vehicle portions 100, 130 in opposite directions, depending on what adjustments are necessary to align the launch vehicle portions 100, 130 and/or their bolt holes 400, 405, and/or to otherwise reshape the cross-sections of the launch vehicle portions 100, 130. In some embodiments, the actuation assembly 510 can include a suitable structure for limiting or preventing rotation of the actuation block 585 when the shaft 580 is rotated. For example, in some embodiments, the actuation block 585 is attached to a linear bearing car 597. The chassis 575 can include a rail element 598. The car 597 can move along the rail element 598 while resisting or preventing rotation of the actuation block 585 relative to the remainder of the actuation assembly 510.

Figure 6:
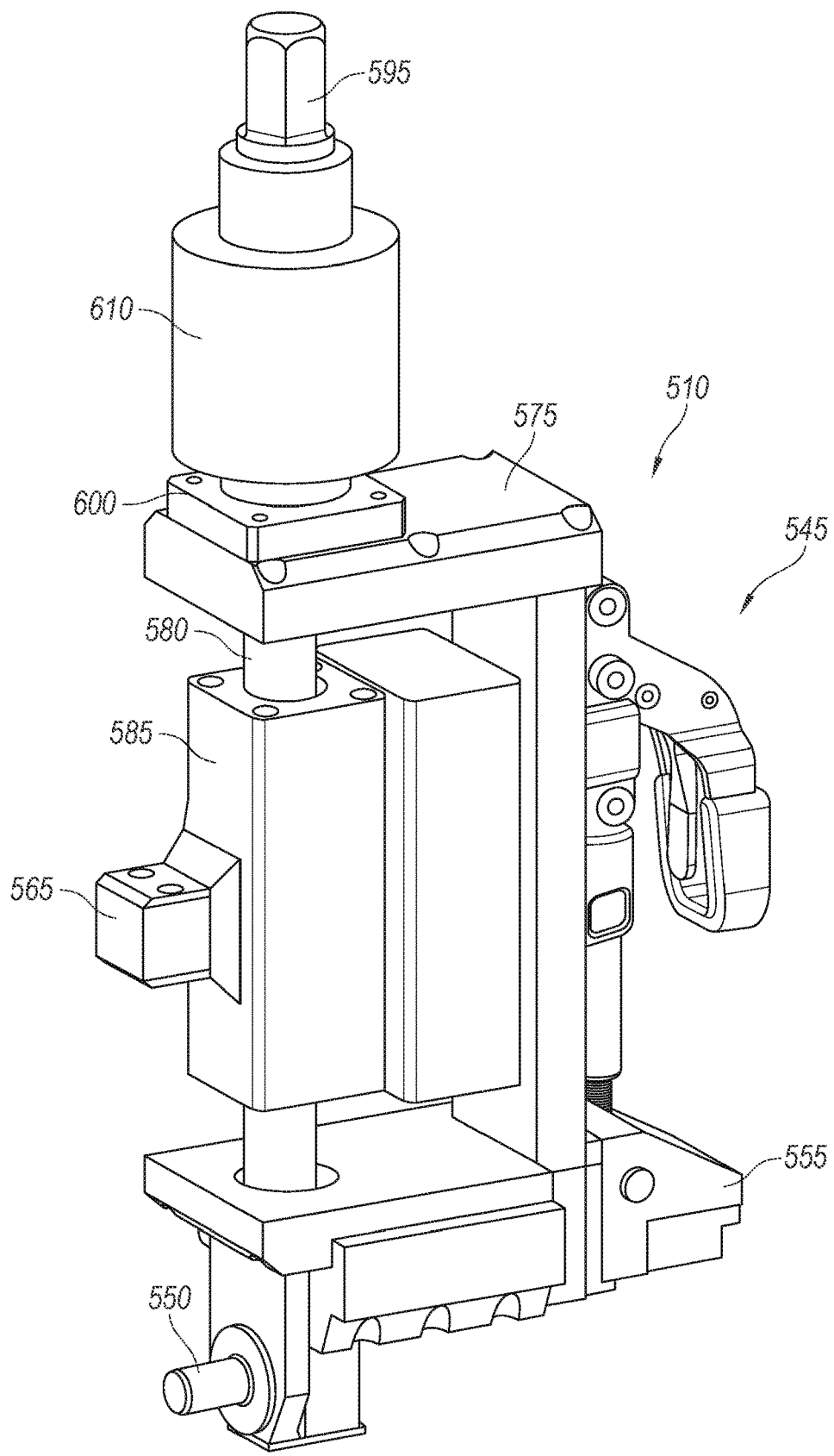
FIG. 6 is a partially schematic perspective view of an actuation assembly configured in accordance with embodiments of the present technology.

FIG. 6 is a partially schematic perspective view of the actuation assembly 510. In some embodiments, the input shaft 595 can include a hex head shape for engaging the hand tool 590 (see FIG. 5), although in further embodiments, other shapes may be used for engaging a suitable hand tool. In some embodiments, the actuation assembly 510 can include a thrust bearing 600 that facilitates rotating the threaded shaft 580 despite increasing axial loads on the threaded shaft 580 during operation (i.e., when the actuation nub 565 applies pushing and pulling forces to the receiver assembly 505, see FIG. 5). In some embodiments, the actuation assembly 510 can include a torque limiting coupler 610 to connect the input shaft 595 to the threaded shaft 580. The torque limiting coupler 610 can limit the loads applied to the force interface 560 (see FIG. 5) and to the launch vehicle portions 100, 130 to reduce risk of damaging the relevant components. The chassis 575 carries the various components of the actuation assembly 510.

Figure 7:
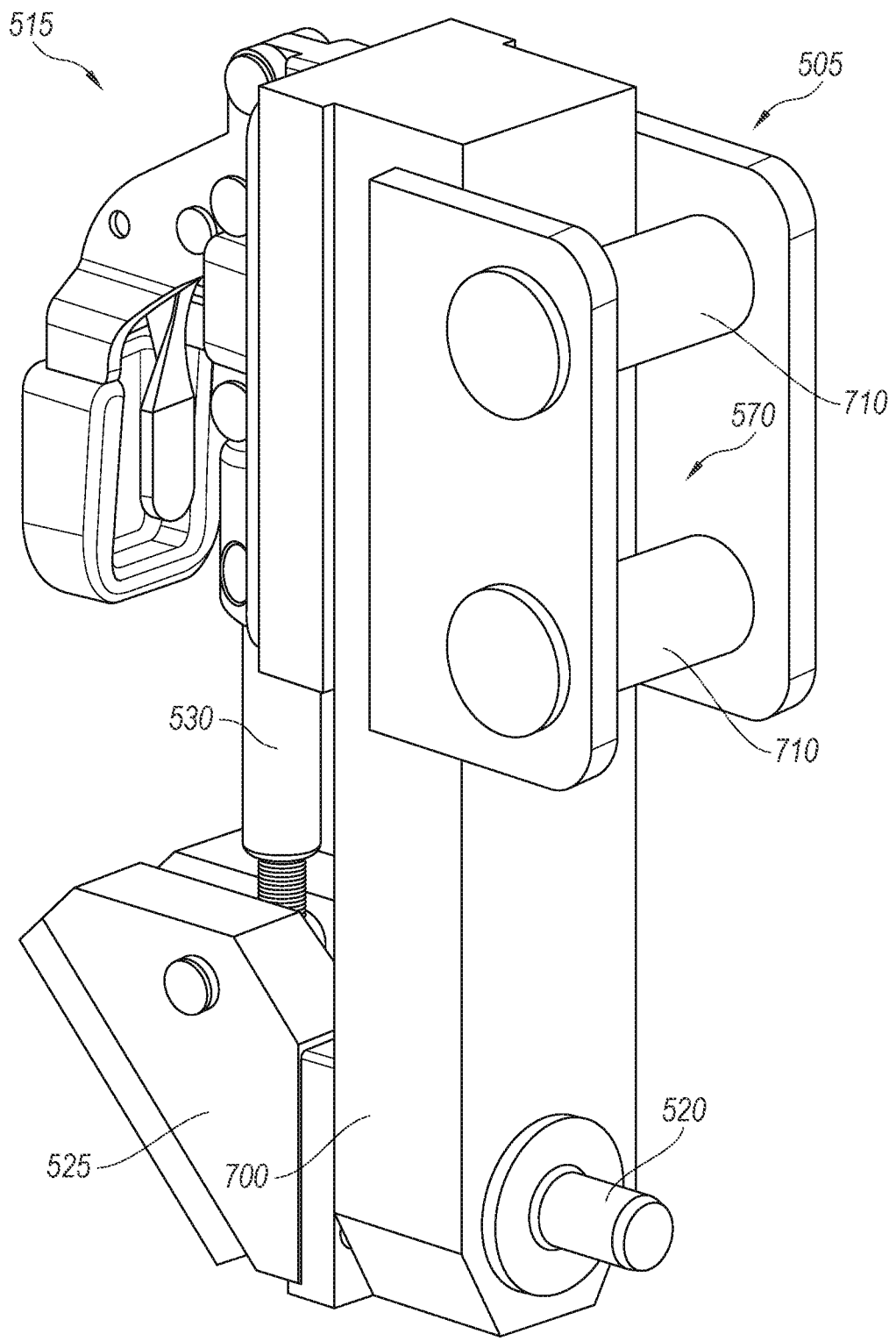
FIG. 7 is a partially schematic perspective view of a receiver assembly configured in accordance with embodiments of the present technology.

FIG. 7 is a partially schematic perspective view of the receiver assembly 505. A chassis 700 carries the components of the receiver assembly 505. In some embodiments, the socket 570 can be formed as an opening between two shear pins 710 carried by the chassis 700 and fixed in place relative to the chassis 700.

Figure 8:
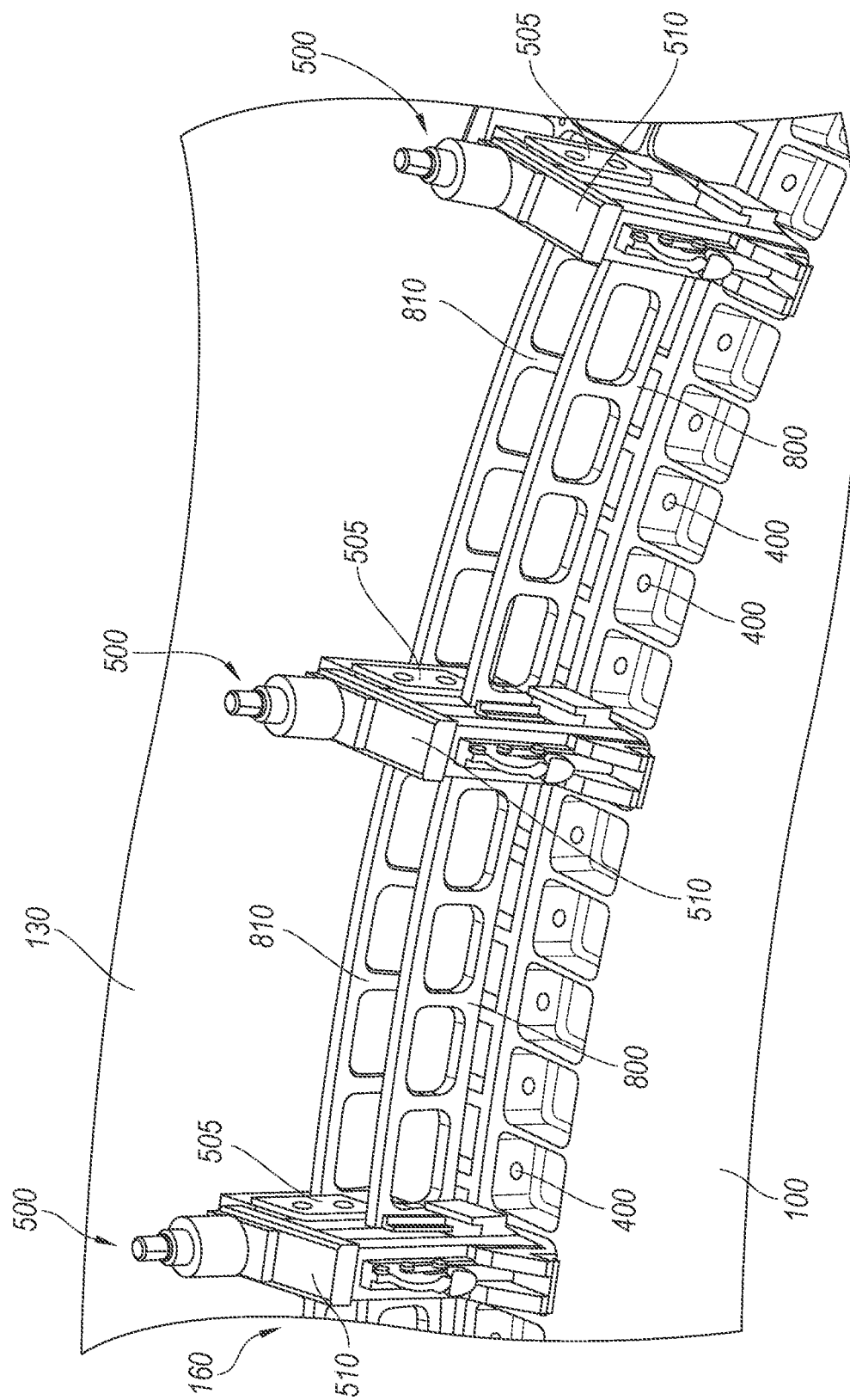
FIG. 8 is a partially schematic perspective view of the mating interface between the first launch vehicle portion and the second launch vehicle portion, with multiple alignment tools positioned to align the portions in accordance with some embodiments of the present technology.

FIG. 8 is a partially schematic perspective view of the mating interface 160 between the first launch vehicle portion 100 and the second launch vehicle portion 130, with multiple alignment tools 500 positioned to align the portions 100, 130, in accordance with some embodiments of the present technology. In some embodiments, the alignment tools 500 can be used individually. However, in other embodiments, the alignment tools 500 can be used in groups of two, three, or more. For example, in some embodiments, two or more alignment tools 500 can be positioned on the launch vehicle portions 100, 130 and distributed around the perimeter of the launch vehicle portions 100, 130.

Although the alignment tools 500 can be used individually and separately, in some embodiments, the alignment tools 500 can be rigidly connected together with one or more bracing beams 800, 810. For example, a first bracing beam 800 can rigidly connect two adjacent actuation assemblies 510 and a second bracing beam 810 can rigidly connect two adjacent receiver assemblies 505. The optional bracing beams 800, 810 are configured to facilitate shaping (e.g., rounding or circularizing) the launch vehicle portions 100, 130 by forcing the alignment tools 500 to be positioned where they align the bolt holes 400, 405 according to the required shape at the mating interface 160 (e.g., a circular shape). Due to the perspective of FIG. 8, the bolt holes 405 of the second launch vehicle portion 130 are not visible, but they are understood to be generally opposite to the bolt holes 400 of the first launch vehicle portion 100 (see FIG. 5). The bracing beams 800, 810 also reduce rotation of the alignment tools 500 relative to each other and relative to the launch vehicle portions 100, 130. When the bolt holes 400, 405 in each of the launch vehicle portions 100, 130 are suitably aligned, the portions 100, 130 can be bolted together, and the tool 500 can be moved to another radial location at the mating interface 160 or removed (thereby exposing the bolt holes 400, 405 where the tools 500 were previously positioned, to insert fasteners).

Figure 9:
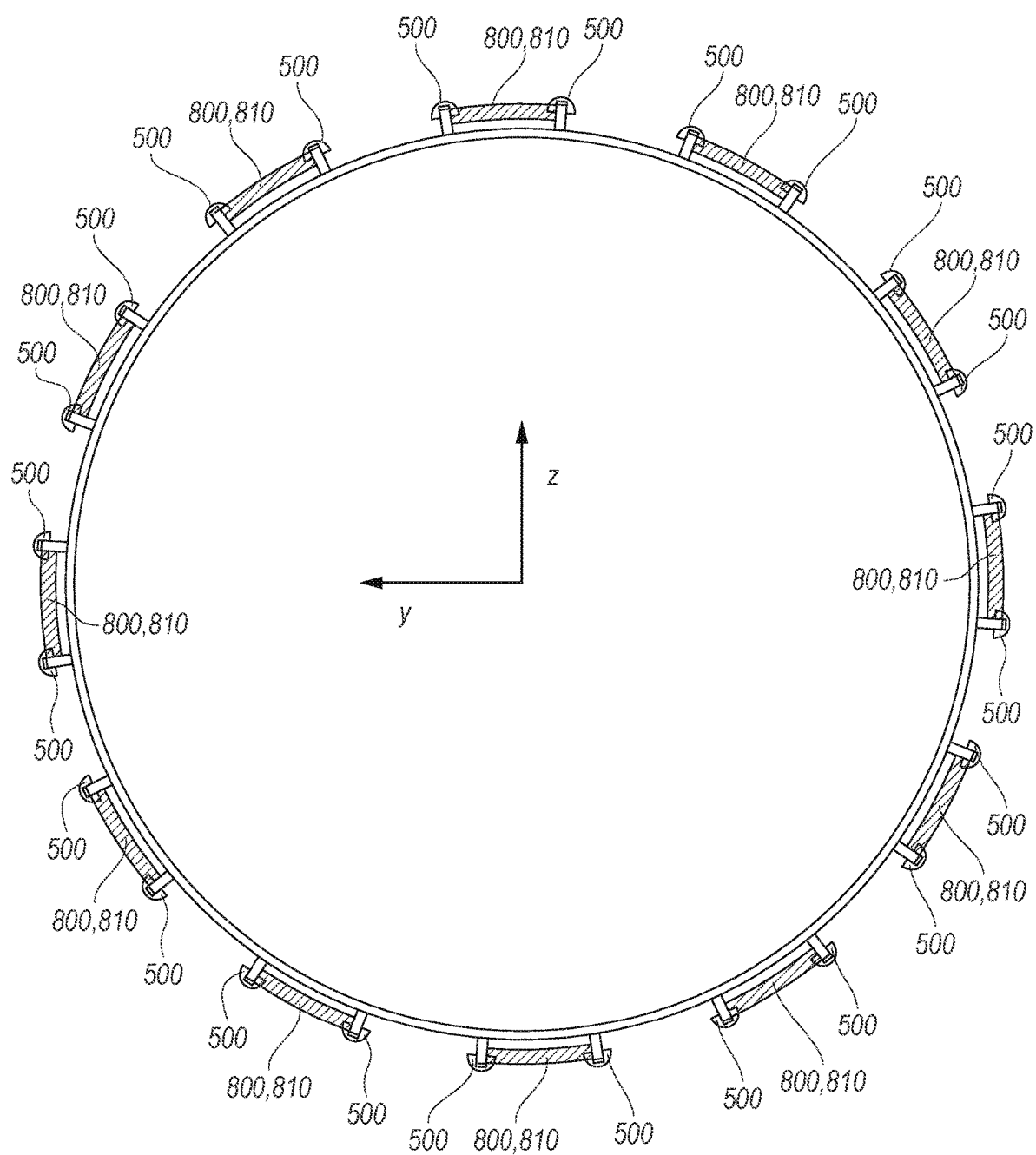
FIG. 9 is a schematic illustration of a distribution of alignment tools and bracing beams connecting some of the alignment tools around the perimeter of a mating interface between launch vehicle portions, in accordance with embodiments of the present technology.

FIG. 9 is a schematic illustration of a distribution of alignment tools 500 and bracing beams 800, 810 around the perimeter of the mating interface 160, in accordance with embodiments of the present technology. In some embodiments, alignment tools 500 and bracing beams 800, 810 are distributed around the entire perimeter of the mating interface 160 to facilitate alignment and fastening at the bolt holes 400, 405 (see FIGS. 5 and 8).

Figure 10:
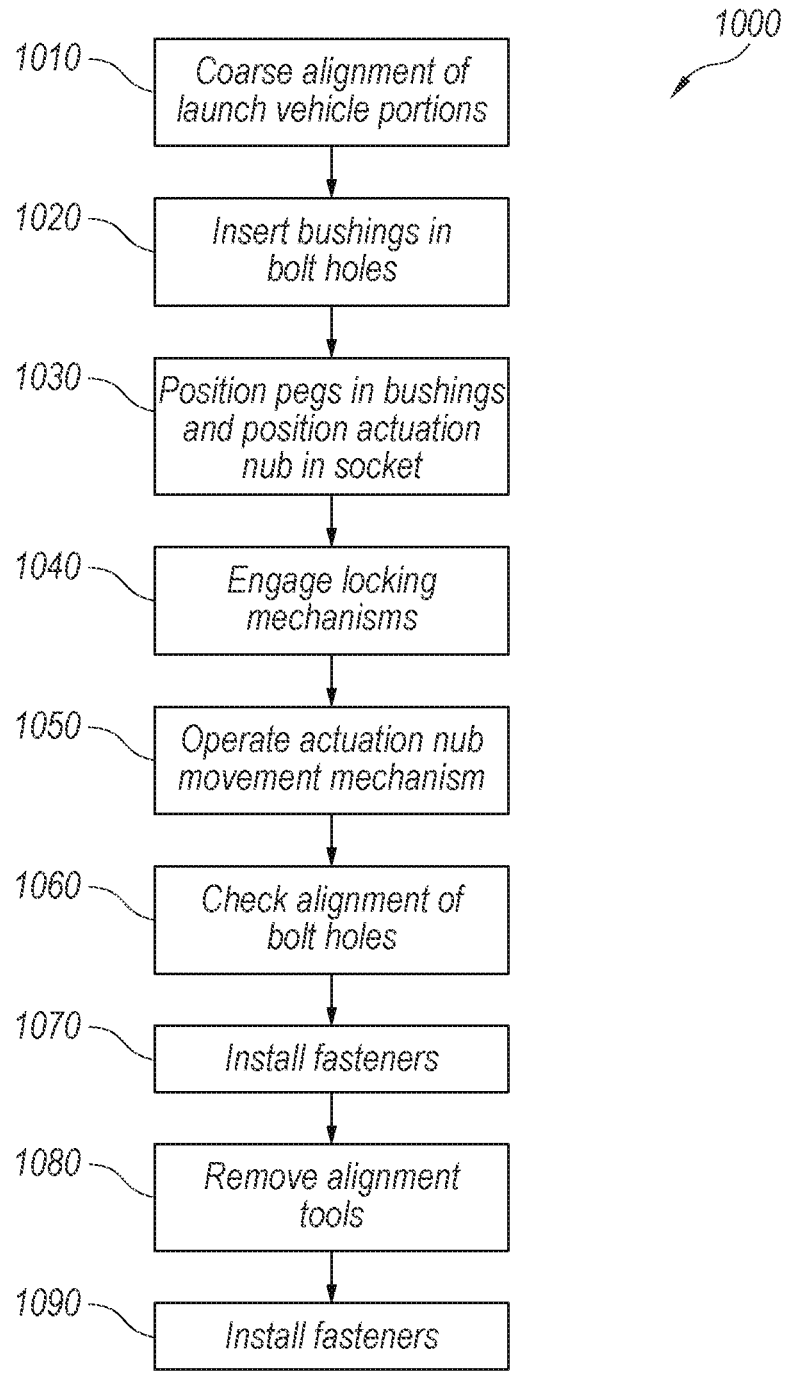
FIG. 10 is a flow chart illustrating a method of aligning and fastening together two launch vehicle portions.

FIG. 10 is a flow chart illustrating a method 1000 of aligning and fastening together two launch vehicle portions (e.g., the launch vehicle portions 100, 130 described above). Beginning at block 1010, operators coarsely adjust the launch vehicle portions 100, 130, for example, using the movable platform 120 described above. The portions 100, 130 can be brought together to be approximately flush at the mating interface 160 (see FIG. 4, for example). In block 1020, operators may optionally install the bushings 440 in the bolt holes 400, 405 of the portions 100, 130 (see FIG. 4). In block 1030, operators can position the pegs 520, 550 in the bolt holes 400, 405 and/or in the bushings 440, and the operators can position the actuation nub 565 in the socket 570 (see FIG. 5). In block 1040, operators can engage the locking mechanisms 515, 545 of the alignment tool 500 to fix the alignment tool 500 to the launch vehicle portions 100, 130. In block 1050, operators can operate the mechanism that moves the actuation nub 565 to push or pull on the socket 570 and the bolt holes 400, 405, as described above with regard to FIGS. 5 and 6. Optionally, sometime before operating the mechanism to move the actuation nub 565, additional alignment tools 500 may be positioned on the launch vehicle portions 100, 130 and one or more bracing beams 800, 810 may be positioned to connect multiple alignment tools 500.

In block 1060, operators can check the alignment of the bolt holes 400, 405, for example, using GO/NO-GO gauges or by attempting to fit the fasteners in the bolt holes 400, 405. In some embodiments, alignment does not necessarily mean perfect alignment, rather, alignment includes alignment of the bolt holes 400, 405 that is sufficient for a fastener to fit in both bolt holes 400, 405 at the same time. If the alignment is sufficient, in block 1070, operators can install the fasteners in the open bolt holes 400, 405. When several fasteners are installed (for example, filling most or all of the bolt holes 400, 405 that do not have pegs 520, 550), at block 1080, the alignment tool 500 can be removed (including the bushings 440, if any). In block 1090, the remaining fasteners can be installed in the open bolt holes 400, 405. Optionally, in block 1030, the method can further include connecting adjacent alignment tools 500 using one or more bracing beams 800, 810 (see FIGS. 8 and 9).

One feature of several of the embodiments described above with regard to FIGS. 1-10, and with other embodiments configured according to the present disclosure, is an improved mating process for the launch vehicle portions, achieved by aligning bolt holes (and/or other fastening features) and/or maintaining or restoring the cross-sectional shape of the launch vehicle portions before and/or during the mating or integration process. Alignment tools and associated equipment configured in accordance with embodiments of the present technology may have a relatively light weight (e.g., 40 pounds) and/or a sufficiently small size to facilitate use and manipulation by one or more human technicians, without the assistance of a robot or other mechanical assistance. For example, a technician can apply torque to the input shaft 595 with a standard hand tool. In some embodiments, however, a robot can move and/or operate the tools and associated equipment.

From the foregoing, it will be appreciated that specific embodiments of the disclosed technology have been described herein for purposes of illustration, but that various modifications may be made without deviating from the technology. For example, where a hand tool or manual device causes motion or force, in some embodiments, a machine and/or motor may be used to provide the motion or force. Accordingly, the processes described herein can be performed manually and/or by a robotic device.

In further embodiments, one or both of the locking mechanisms 515, 545 can be omitted and an alignment tool 500 can connect to a launch vehicle portion 100, 130 using only a peg 520, 550. The bathtub regions 420 can have any suitable shape, and the tooling disclosed herein can be modified to be received in differently-shaped bathtub regions 420. Further embodiments of the present technology can adjust bolt holes that are not oriented parallel to the launch vehicle portion. Steps of the method 1000 described above with regard to FIG. 10 may be performed in a different order, and some steps may be omitted. Although specific dimensions have been provided for context and/or to indicate representative embodiments, various further embodiments can have other sizes.

Although embodiments of the present technology are disclosed herein in connection with rockets and launch vehicle portions, embodiments of the present technology can be implemented in connecting other structures, including horizontally-oriented non-circular structures, vertical structures, or generally in other circumstances in which tubes, pipes, or hollow sections (which may not necessarily be launch vehicle portions) are to be joined. In some embodiments, the technology can facilitate alignment of welding locations or other attachment locations, for example, by using attachment points to receive the pegs 520, 550 instead of, or in addition to, fastener holes 400. Accordingly, embodiments of the present technology may be used to align structures that are connected together with fastening methods other than bolts.

Certain aspects of the technology described in the context of particular embodiments may be combined or eliminated in other embodiments. Further, while advantages associated with certain embodiments of the disclosed technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

As used herein, the term "and/or" when used in the phrase "A and/or B" means "A, or B, or both A and B." A similar manner of interpretation applies to the term "and/or" when used in a list of more than two terms.

I claim:

1. A method of aligning and fastening a first launch vehicle portion to a second launch vehicle portion, the method comprising:
coupling a receiver assembly to the first launch vehicle portion;
coupling an actuation assembly to the second launch vehicle portion;
establishing a load path between the receiver assembly and the actuation assembly;
operating the actuation assembly to apply oppositely-directed forces to the receiver assembly and to the second launch vehicle portion until a first fastener hole in the first launch vehicle portion aligns with a second fastener hole in the second launch vehicle portion, wherein the actuation assembly comprises an actuation nub in engagement with a socket of the receiver assembly;
and installing one or more fasteners in the first launch vehicle portion and in the second launch vehicle portion to fasten the first launch vehicle portion to the second launch vehicle portion.

2. The method of claim 1, wherein coupling the receiver assembly to the first launch vehicle portion comprises positioning a first peg in the first fastener hole in the first launch vehicle portion, and wherein coupling the actuation assembly to the second launch vehicle portion comprises positioning a second peg in the second fastener hole in the second launch vehicle portion.

3. The method of claim 2, further comprising positioning a bushing in the first fastener hole or the second fastener hole.

4. The method of claim 1, wherein coupling the receiver assembly to the first launch vehicle portion comprises engaging a first locking mechanism comprising a first movable shoe positioned to press against the first launch vehicle portion, and wherein coupling the actuation assembly to the second launch vehicle portion comprises engaging a second locking mechanism comprising a second movable shoe positioned to press against the second launch vehicle portion.

5. The method of claim 1, wherein establishing the load path between the receiver assembly and the actuation assembly comprises positioning the actuation nub carried by the actuation assembly in the socket carried by the receiver assembly or positioning the actuation nub carried by the receiver assembly in the socket carried by the actuation assembly.

6. The method of claim 1, wherein the receiver assembly is a first receiver assembly and the actuation assembly is a first actuation assembly, the method further comprising:
coupling a second receiver assembly to the first launch vehicle portion;
coupling a second actuation assembly to the second launch vehicle portion; and
establishing a load path between the second receiver assembly and the second actuation assembly.

7. The method of claim 6, further comprising:
via a bracing beam, connecting the first receiver assembly to the second receiver assembly or connecting the first actuation assembly to the second actuation assembly.

8. A method of aligning a first component with a second component, the method comprising:
coupling a receiver assembly to the first component, wherein the receiver assembly includes a first connecting element;
coupling an actuation assembly to the second component, wherein the actuation assembly carries a second, movable, connecting element;
establishing a load path by engaging the first connecting element and the second connecting element, wherein the first connecting element comprises an actuation nub and the second connecting element comprises a socket; and
operating the actuation assembly to move the second connecting element, wherein the actuation assembly applies one or more forces to the receiver assembly and to the second component, to move the second component relative to the first component and/or to move the first component relative to the second component.

9. The method of claim 8, wherein the first connecting element is fixed in place relative to a chassis of the receiver assembly.

10. The method of claim 8, wherein coupling the receiver assembly to the first component comprises positioning a first peg in a first fastener hole in the first component, and wherein coupling the actuation assembly to the second component comprises positioning a second peg in a second fastener hole in the second component.

11. The method of claim 8, wherein coupling the receiver assembly to the first component comprises engaging a first locking mechanism comprising a first movable shoe positioned to press against the first component, and wherein coupling the actuation assembly to the second component comprises engaging a second locking mechanism comprising a second movable shoe positioned to press against the second component.

12. The method of claim 8, further comprising: establishing the load path between the first connecting element and the second connecting element comprises positioning the actuation nub in the socket.

13. The method of claim 8, wherein the receiver assembly is a first receiver assembly and the actuation assembly is a first actuation assembly, the method further comprising:
coupling a second receiver assembly to the first component;
coupling a second actuation assembly to the second component; and
establishing a load path between the second receiver assembly and the second actuation assembly.

14. The method of claim 13, further comprising:
via a bracing beam, connecting the first receiver assembly to the second receiver assembly and/or connecting the first actuation assembly to the second actuation assembly.

15. The method of claim 8, wherein the first component is a first launch vehicle portion, the second component is a second launch vehicle portion, and the method further comprises aligning a first fastener hole in the first launch vehicle portion with a second fastener hole in the second launch vehicle portion.

16. A method of aligning a first fastener hole in a first component with a second fastener hole in a second component, the method comprising:
 engaging a portion of a receiver assembly with the first fastener hole;
 engaging a portion of an actuation assembly with the second fastener hole;
 establishing a load path between a first connecting element carried by the receiver assembly and a second connecting element carried by the actuation assembly, wherein the second connecting element is movable, wherein the first connecting element comprises an actuation nub and the second connecting element comprises a socket, the load path is established when the actuation nub engages the socket; and
 operating the actuation assembly to move the second connecting element, wherein movement of the second connecting element applies force to the first connecting element to move the receiver assembly and the first fastener hole relative to the second fastener hole and/or to move the second fastener hole relative to the first fastener hole.

17. The method of claim 16, wherein the first component is a first launch vehicle portion, the second component is a second launch vehicle portion, the receiver assembly is a first receiver assembly, and the actuation assembly is a first actuation assembly, and the method further comprises:
 coupling a second receiver assembly to the first launch vehicle portion;
 coupling a second actuation assembly to the second launch vehicle portion;
 establishing a load path between the second receiver assembly and the second actuation assembly; and
 via a bracing beam, connecting the first receiver assembly to the second receiver assembly and/or connecting the first actuation assembly to the second actuation assembly.

18. The method of claim 16, wherein engaging the portion of the receiver assembly with the first fastener hole comprises positioning a first peg in the first fastener hole, and wherein engaging the portion of the actuation assembly with the second fastener hole comprises positioning a second peg in the second fastener hole.

19. The method of claim 16, wherein moving the second connecting element comprises rotating a threaded shaft relative to a chassis of the actuation assembly to apply force to the second connecting element.

20. The method of claim 16, wherein the receiver assembly comprises a first locking mechanism having a first movable shoe, the actuation assembly comprises a second locking mechanism having a second movable shoe, and the method further comprises:
 causing the first movable shoe to press against the first component; and
 causing the second movable shoe to press against the second component.

\* \* \* \* \*